Patented Sept. 25, 1934

1,974,801

UNITED STATES PATENT OFFICE 1,974,801

COATING COMPOSITION

Russell L. Jenkins, Anniston, Ala., assignor to Swann Research, Incorporated, a corporation of Alabama No Drawing. Application February 25, 1932, Serial No. 595,222

9 Claims. (Cl. 134—26)

This invention relates to paint and varnish compositions having improved film forming properties and especially having high resistance to water, acids, alkalies, and other chemicals.

One object of this invention is the production of a hard quick drying paint or varnish film. Another object is the production of a chlorinated varnish resin which can be used to produce a satisfactory hard film without the necessary admixture of any additional hardening resins.

Gardner in British Pat. No. 351,637 has disclosed the use of chlorinated diphenyl admixed with various well known resins such as glycerine phthalate, ester gum, cumarone, or toluene sulfonamide. The use of chlorinated diphenyl particularly when it contains only 60% of chlorine in a varnish or paint is attended with some difficulty because of the softness and tackiness of the film produced. These difficulties are only partially overcome by the use of the resinous mixtures disclosed by Gardner.

I have now found that more satisfactory paint, varnish and lacquer compositions may be prepared by employing in place of the natural or synthetic resins mentioned above, either alone or in part, chlorinated polyphenyls. Such polyphenyls as I have found useful are produced as a by-product during the thermal synthesis of diphenyl from benzol as will more fully hereinafter appear. I have also found that when such polyphenyls are employed considerably more latitude is had as to the extent of chlorination of such bodies which is not present in the case of the chlorinated diphenyl alone. One manifestation of this latitude is the fact that considerably harder coating films may be obtained without danger of the separation on standing of crystalline bodies such as crystalline chlorinated diphenyl from the liquid paint or varnish. This separation is particularly liable to occur if chlorinated diphenyl alone is employed.

I have found it desirable, in preparing the resin for my improved coating composition in order that the full advantage of my invention may be realized to separate the diphenyl completely from the higher boiling polyphenyls. This precaution is desirable since in chlorinating a mixture of polyphenyls together with a small amount of diphenyl, the diphenyl is more rapidly chlorinated and hence reached a chlorine content at which it may separate from liquid paint and varnish composition. This is apparently the result of uneven chlorination and only applies to the chlorination of polyphenyl when small amounts, say up to 15% or 20% of diphenyl are present in the polyphenyls. It does not apply to cases where greater percentages of diphenyl are contained in the polyphenyls which may be chlorinated to a chlorine content up to 65% without the development of crystalline bodies either in the resin itself or in the liquid coating composition. Hence it will be understood that I am not limited to the use of polyphenyls free from diphenyl, but may use both of these bodies when the above precautions are observed.

My invention will be more completely understood from the following detailed description:

In preparing my improved resin, I collect the pyrolysis product obtained from the diphenyl converter such for example as described in U. S. Patent 1,894,283, remove the unchanged benzol and distill off a diphenyl fraction by carrying the boiling point to at least 270° C. The residue remaining in the still boiler consists of a mixture of relatively high boiling compounds, having a boiling point above that of diphenyl. Of the residue remaining, part, usually 80% may be distilled at atmospheric pressure, the residue then consisting of a still higher boiling fraction which may be caused to distill if a vacuum is applied thereto. Since distillations are more conveniently carried out at atmospheric pressure the further description of the bodies produced will be confined to the products obtained in that manner.

A sample of the high boiling bodies which was distillable at atmospheric pressure and hence comprised 80% of the total high boiling residue contained the following individual hydrocarbons:—

| | Percent |
|---|---|
| 1,2 diphenyl benzene | 4.3 |
| 1,3 diphenyl benzene | 58.8 |
| 1,4 diphenyl benzene | 29.5 |
| Ortho triphenylene | 1.1 |
| Di-biphenyl, etc. | 6.3 |

The remaining 20% of the high boiling compounds which are undistillable at atmospheric pressure undoubtedly contained hydrocarbons related to the above but of increasing complexity.

For the purpose of manufacturing my improved resin, I employ principally the fraction distillable at atmospheric pressure, but if a greater yield or more varied properties are desirable more than the usual 80% may be distilled at reduced pressure and utilized. During such a distillation the boiling point may rise from 270° C. to as high as 410° C. at atmospheric pressure, the product obtained being a crystalline yellow wax-like solid.

In view of the fact that the herein described organic bodies are new, at least as far as their commercial production is concerned, the following nomenclature is adopted for the purpose of this specification and claims:—

In order to distinguish between the polyphenyl bodies and diphenyl itself, the former term will be understood as applying to the mixture of polyphenyls having a higher boiling point than diphenyl or as polyphenyl hydrocarbons obtained as a by-product in the diphenyl synthesis, or as polyphenyls having two or more phenyl groups linked directly to a benzene nucleus.

The crystalline yellow wax-like solid fraction, obtained by the distillation above mentioned, is chlorinated using iron or iodine as a catalyst until the chlorine content of the product is in the neighborhood of 60 to 65%. Chlorination is accomplished by passing chlorine directly through the molten mass during which process the temperature is allowed to rise to 260° C. in order to maintain the fluidity of the mass. At the completion of chlorination the mass is a black non-crystalline solid with a softening point in the neghborhood of 125° C.

The black chlorinated resin is now distilled in a high vacuum until say 85% to 95% had been recovered. In order more readily to obtain a clear light colored resin a small amount of lime is added to the distilling flask before distillation is started. The product is an amber to light yellow hard brittle transparent resinous mass, with a softening point in the neighborhood of 125° C.

A resin having a lower softening point than above described may be obtained by stopping the chlorination at a lower chlorine content. If the chlorination is stopped when the product contains 42 percent of chlorine, it will be somewhat softer. It is distilled in the manner described above, the light yellow brittle mass having a softening point in the neighborhood of 53° C. Various intermediate softening points may be obtained between the limits above set out by suitably varying the chlorine content.

Another chlorinated hydrocarbon composition which I have found useful is that formed by mixing together diphenyl and polyphenyl bodies above referred to and chlorinating the mixture in the manner above mentioned. A suitable mixture will be obtained by mixing together 60 parts of technical diphenyl and 40 parts of polyphenyls, the mixture being then chlorinated to 63% or 65% chlorine content. This product is then distilled in a vacuum as above described and a light yellow transparent resin having a softening point in the range of 70 to 80° C. obtained.

As has already been pointed out it is preferable when employing mixtures of diphenyl and polyphenyls to use proportions of these substances so that the diphenyl is present in appreciable quantity. Usually more than 25 percent of diphenyl is desirable in the hydrocarbon mixture.

The use of chlorinated diphenyl in compositions in which the chlorinated polyphenyls are the principal constituents is desirable where it is required to produce flexibility of the film without sacrificing the desirable properties of alkali and water resistance. For this purpose it may be assumed that the chlorinated diphenyl acts as a plasticizer.

The above described chlorinated bodies are used in drying oils such as linseed or tung oils, or in semi-drying oils such as soya bean oil, to give improved coating compositions. Several means for producing my coating compositions are given in detail below:—

For compounding a quick drying house paint I body 400 grams of tung oil and 500 grams of the above described chlorinated polyphenyl resin containing say 60% chlorine by heating to 525° F. in say 25 minutes. Then add 1200 grams varnish makers refined linseed oil and again heat to 550° F. in 45 minutes. Cool to 475° F. and hold for 25 minutes. At this point 700 grams of turpentine or mineral spirits are added followed by 16 grams of concentrated cobalt drier (cobalt linoleate) and 32 grams of concentrated manganese drier (manganese linoleate). The varnish base is cooled and is now ready for grinding of the pigment. Many satisfactory pigments may be employed. I have found a satisfactory one to consist of lead carbonate, zinc oxide, and silica, which ingredients are incorporated in the varnish base prepared above in the following proportions:—

A paste of 10 fluid oz. of the above varnish, 12⅔ oz. of zinc oxide and 1 lb. of lead carbonate and 3⅕ oz. of finely ground silica is made and fed to an ordinary paint mill. The ground paint paste is then further mixed with 11 fluid oz. of the above varnish, the final product being a liquid paint ready for use.

For the purpose of producing a spar varnish the above proportions are varied somewhat. A satisfactory formula may contain the following proportions:

| | Grams |
|---|---|
| Tung oil | 200 |
| Chlorinated high boiling compounds (boiling between 270 and 400° C. chlorinated to 63% chlorine content and distilled) | 100 |
| Bodied linseed oil | 40 |
| Mineral spirits | 400 |
| Cobalt drier | 25 |

These ingredients are combined in the manner well known to the practical varnish maker and will produce a varnish having excellent weathering properties, a hard film and good resistance to water and alkalies.

Considerable fire-resistance may be imparted to varnish or paint by the incorporation of relatively large amounts of the chlorinated bodies. These may be used in a formula such as the following:—

| | Grams |
|---|---|
| Special bodied tung—linseed oil | 720 |
| Chlorinated diphenyl 54% chlorine content which has been distilled | 800 |
| Chlorinated high boiling compounds (boiling between 270 and 400° C. chlorinated to 63% chlorine content and distilled) | 800 |
| Conc. cobalt linoleate drier | 8 |
| Mineral spirits | 1600 |

This varnish may be pigmented with various inorganic pigments and used for application to canvas for tents, awnings, etc., or to asbestos-cotton cloth or to wood shingles to prevent ignition by sparks, etc.

The above described high boiling compounds when chlorinated to between 60 and 65% chlorine content may also be incorporated into nitrocellulose or cellulose acetate lacquers in the usual manner. They will be found to add greatly to the weather and alkali resistance of this type of coating composition as well as decreasing the flammability of these products.

While I have described several embodiments of my invention, it will be apparent to those skilled in the art that it is not so limited, but that it is susceptible of various changes and modifications without departing from the spirit thereof and I desire that only such limitations shall be placed thereupon as may be imposed by the prior art or as are specifically set forth in the appended claims.

What I claim is:—

1. A liquid oleoresinous coating composition comprising a drying oil and a chlorinated polyphenyl.

2. A liquid oleoresinous coating composition containing tung oil, a chlorinated polyphenyl and a chlorinated diphenyl.

3. A liquid oleoresinous coating composition containing linseed oil, a chlorinated mixture of polyphenyls and diphenyl, said mixture having a softening point in the range of 53 to 125° C.

4. A liquid paint containing a drying oil and a chlorinated polyphenyl having a softening point in the range of 53 to 125° C. and a pigment.

5. A liquid varnish containing tung oil, a chlorinated polyphenyl having a softening point in the range of 53 to 125° C., volatile thinner and a drier.

6. A liquid oleoresinous coating composition of the paint or varnish type comprising a drying oil, a chlorinated polyphenyl resin having a softening point in the range of 53° to 125° C. and a drier.

7. A liquid oleoresinous coating composition of the paint or varnish type comprising a drying oil, a chlorinated polyphenyl resin having a softening point in the range of 70° to 80° C., and a drier.

8. A fire-resisting oleoresinous coating composition of the paint or varnish type comprising a drying oil, a relatively high percentage of a chlorinated polyphenyl resin and chlorinated diphenyl, and a drier.

9. A fire-resisting oleoresinous coating composition of the paint or varnish type comprising a bodied drying oil, a relatively high percentage of a chlorinated polyphenyl resin containing in the neighborhood of 63% of chlorine, a relatively high percentage of a chlorinated diphenyl containing in the neighborhood of 54% of chlorine, together with a drier.

RUSSELL L. JENKINS.